United States Patent
Parsonese et al.

(10) Patent No.: US 8,930,586 B2
(45) Date of Patent: Jan. 6, 2015

(54) IDENTIFICATION OF ELECTRONIC DEVICES OPERATING WITHIN A COMPUTING SYSTEM

(71) Applicant: International Business Machines Corporation, Armonk, NY (US)

(72) Inventors: James J. Parsonese, Cary, NC (US); Luke D. Remis, Raleigh, NC (US); Kevin S. D. Vernon, Durham, NC (US)

(73) Assignee: Lenovo Enterprise Solutions (Singapore) Pte. Ltd., Serangoon Garden (SG)

( * ) Notice: Subject to any disclaimer, the term of this patent is extended or adjusted under 35 U.S.C. 154(b) by 0 days.

(21) Appl. No.: 13/856,423

(22) Filed: Apr. 3, 2013

(65) Prior Publication Data

US 2014/0304432 A1  Oct. 9, 2014

(51) Int. Cl.
  G06F 3/00      (2006.01)
  G06F 13/38    (2006.01)

(52) U.S. Cl.
  CPC .................................. G06F 13/385 (2013.01)
  USPC ................... 710/14; 710/15; 710/16; 710/17; 710/18

(58) Field of Classification Search
  None
  See application file for complete search history.

(56) References Cited

U.S. PATENT DOCUMENTS

| | | | | |
|---|---|---|---|---|
| 4,787,033 A * | 11/1988 | Bomba et al. | | 710/116 |
| 5,761,697 A * | 6/1998 | Curry et al. | | 711/100 |
| 5,948,077 A * | 9/1999 | Choi et al. | | 710/9 |
| 6,122,704 A * | 9/2000 | Hass et al. | | 711/100 |
| 6,134,616 A * | 10/2000 | Beatty | | 710/104 |
| 6,608,571 B1 * | 8/2003 | Delvaux | | 341/53 |
| 6,789,136 B1 * | 9/2004 | Dunstan | | 710/8 |
| 6,862,637 B1 * | 3/2005 | Stupar | | 710/104 |
| 7,181,557 B1 * | 2/2007 | Falik et al. | | 710/110 |
| 7,606,955 B1 | 10/2009 | Falik et al. | | |
| 7,652,634 B2 * | 1/2010 | Finn et al. | | 343/850 |
| 2004/0176667 A1 * | 9/2004 | Mihai et al. | | 600/300 |
| 2005/0268000 A1 * | 12/2005 | Carlson | | 710/15 |
| 2007/0027655 A1 * | 2/2007 | Schmidt | | 702/188 |
| 2008/0140887 A1 * | 6/2008 | Gallant et al. | | 710/100 |
| 2008/0288666 A1 * | 11/2008 | Hodges et al. | | 710/9 |

(Continued)

FOREIGN PATENT DOCUMENTS

| | | |
|---|---|---|
| EP | 2134025 A1 | 12/2009 |
| GB | 002411013 A | 8/2005 |
| WO | WO2008137813 A1 | 11/2008 |

OTHER PUBLICATIONS

"1-Wire Products Mixed-Signal Design Guide" 4th edition, Maxim Integrated Products, Inc., Feb. 2009.*

(Continued)

*Primary Examiner* — Henry Tsai
*Assistant Examiner* — Jing-Yih Shyu
(74) *Attorney, Agent, or Firm* — Olive Law Group, PLLC

(57) ABSTRACT

Disclosed herein are systems, methods, and apparatuses for identification of electronic devices within a computing system. According to an aspect, a method may be implemented at an electronic device comprising an input. The method may include setting, during a startup state, the input to indicate an identity of the electronic device. Further, the method may include determining an event for changing from the startup state to an operational state. The method may also include changing from the startup state to the operational state in response to determining the event.

18 Claims, 3 Drawing Sheets

(56) References Cited

U.S. PATENT DOCUMENTS

| | | |
|---|---|---|
| 2008/0315934 A1 | 12/2008 | Engl |
| 2009/0024764 A1 | 1/2009 | Atherton et al. |
| 2009/0091422 A1* | 4/2009 | Minoo et al. .................... 340/5.8 |
| 2009/0198841 A1* | 8/2009 | Yoshida et al. ................. 710/16 |
| 2009/0234403 A1* | 9/2009 | Liu et al. ........................... 607/5 |
| 2010/0169534 A1* | 7/2010 | Saarinen et al. .............. 710/316 |
| 2010/0191871 A1* | 7/2010 | Daftardar et al. ............... 710/12 |
| 2011/0016310 A1* | 1/2011 | Yong ............................. 713/155 |
| 2013/0187481 A1* | 7/2013 | Heidler ......................... 307/116 |
| 2013/0322010 A1* | 12/2013 | Hung et al. ............. 361/679.41 |
| 2014/0006678 A1* | 1/2014 | Lai et al. ....................... 710/316 |

OTHER PUBLICATIONS

Kai-Xin Tee et al., "An Intelligent Warehouse Stock Management and Tracking System Based on Silicon Identification Technology and 1-Wire Network Communication", Electronic Design, Test and Application (DELTA), 2011.

Michael Alan McNees, "Design of a Custom ASIC Incorporating CAN™ and 1-Wire® Communication Protocols", PhD diss., The University of Alabama Tuscaloosa, 2012.

Linke, Bernard, "Regain Location Information by Leveraging the 1-Wire® Chain Function—A Simple Signaling and Protocol Method Determines Device Physical Location", Maxim Integrated Products, Application Note 4037, Jun. 7, 2007, pp. 1-7.

\* cited by examiner

IDENTIFICATION OF ELECTRONIC DEVICES OPERATING WITHIN A COMPUTING SYSTEM

BACKGROUND

1. Field of the Invention

The present invention relates to computing systems, and more specifically, to identification of electronic devices operating within computing systems.

2. Description of Related Art 1-wire link technology, such as the 1-WIRE® technology desired by Dallas Semiconductor Corp., is a communications technology that uses a single data line plus ground reference for communication. A 1-wire master initiates and controls communication with one or more 1-wire slave devices on a bus. Each 1-wire slave device has a unique, unalterable, factory-programmed identification number (ID), which serves as a device address on the bus.

In some instances, a computing system may include multiple 1-wire devices of the same type. Although the devices may each contain a unique identifier for addressability, their positional utilization in the computing system may be unknown. In this case, the problem of placing two or more devices of the same type and use for different functions within the computing system is left for a user of these devices. In the case of, for example, two or more devices of different system functions, it may be unknown which one to address via their unique identifier for use in the system. One solution for providing positional identification may be to provide separate 1-wire networks when two or more of the same devices are needed; however, this defeats the capability of a single wire to enable the network. For this and other reasons, it is desired for providing improved techniques for identifying 1-wire devices or other electronic devices operating within a computing system.

BRIEF SUMMARY

Systems, methods, and apparatuses for identification of electronic devices within a computing system are disclosed herein. According to an aspect, a method may be implemented at an electronic device comprising an input. The method may include setting, during a startup state, the input to indicate an identity of the electronic device. Further, the method may include determining an event for changing from the startup state to an operational state. The method may also include changing from the startup state to the operational state in response to determining the event.

DETAILED DESCRIPTION

The figures discussed below and various embodiments described herein in accordance with the present invention are by way of illustration only and should not be construed to limit the scope of the invention. Those skilled in the art will understand that the principles of the present invention may be implemented in any suitably arranged bus or communications network for connecting electronic devices, such as 1-wire devices.

Figure 1:
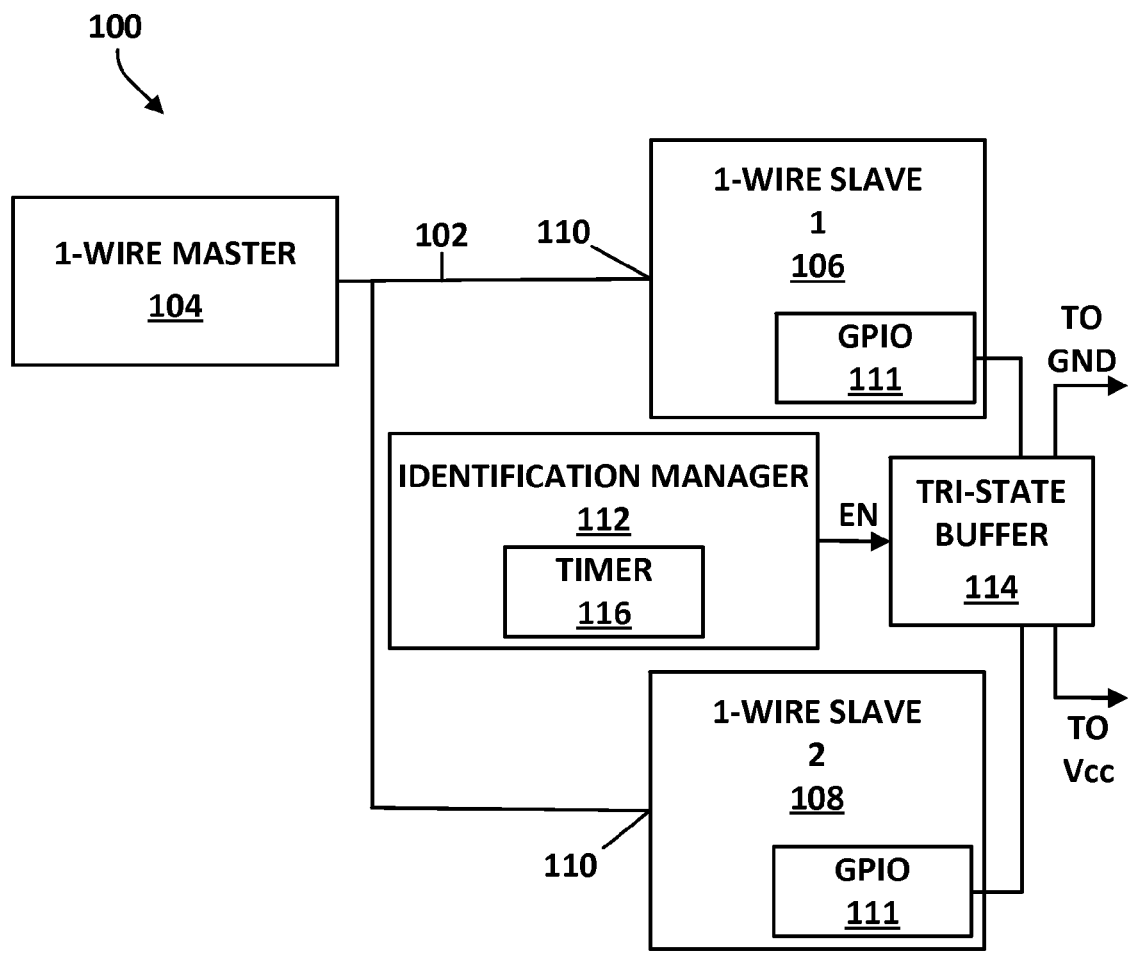
FIG. 1 is a block diagram of a computing system in accordance with embodiments of the present invention.

FIG. 1 illustrates a block diagram of a computing system 100 in accordance with embodiments of the present invention. Referring to FIG. 1, the system 100 is based on a single wire connection. Particularly, the system may include a 1-wire bus 102 that allows a 1-wire master device 104 to communicate with two 1-wire slave devices 106 and 108. The bus 102 allows the master device 104 to communicate with the slave devices 106 and 108 using a single communication line via a suitable protocol. It is noted that while there are two slave devices shown, there may be any suitable number of slave devices depending on the application of the technology. Further, it is noted that the system 100 may be a server system.

In embodiments of the present invention, slave devices 106 and 108 are devices of the same type. In this example, slave devices 106 and 108 are solid-state devices (SSDs) of the same type. Each slave device 106 and 108 includes a bus interface pin 110 connected to the bus 102. The slave device 106 and 108 have a general purpose input/output (GPIO) 111.

Figure 2:
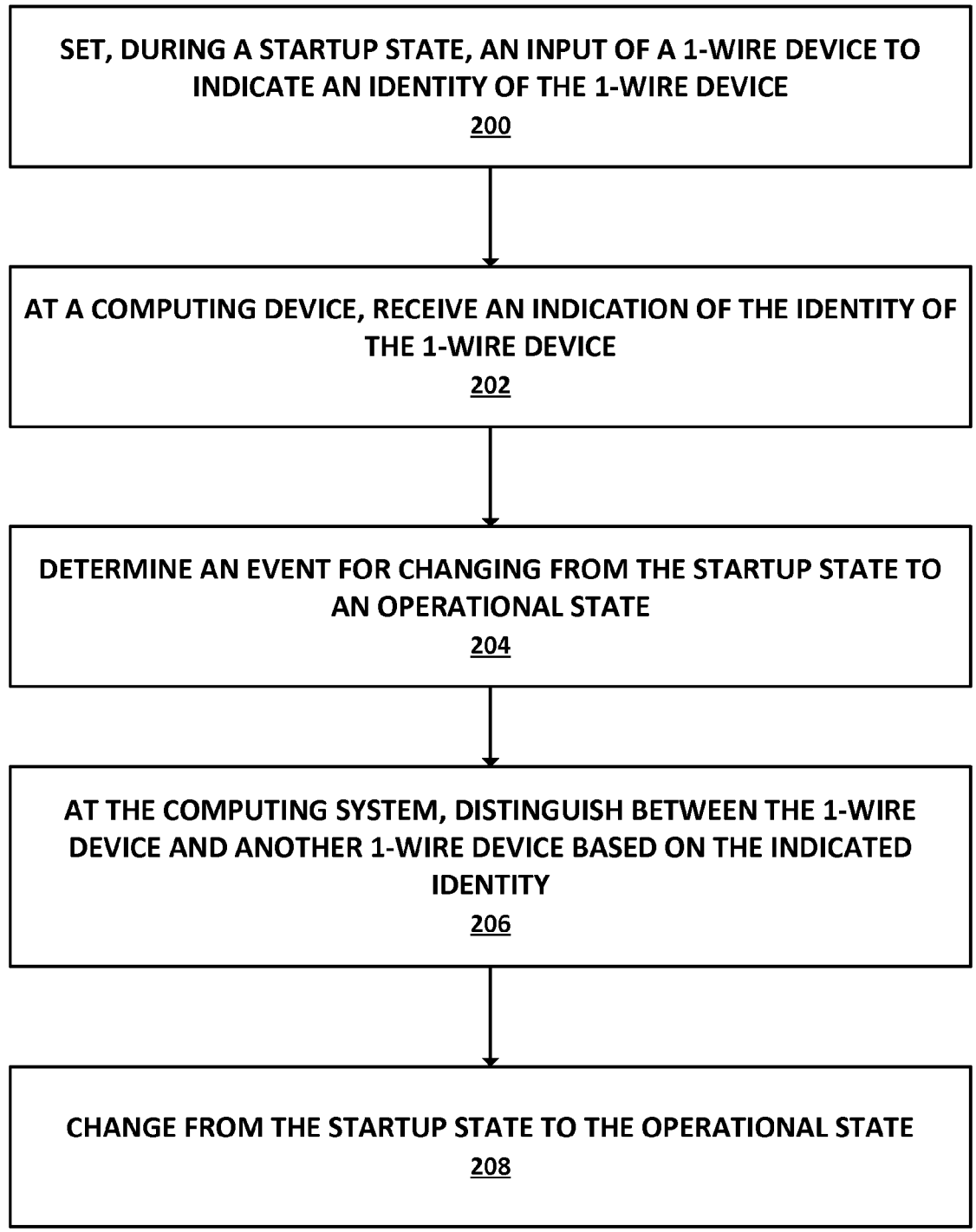
FIG. 2 is a flowchart of an example method for identifying 1-wire slave devices in accordance with embodiments of the present invention.

The system 100 may include an identification manager 112 and a tri-state buffer 114 for implementing functions in accordance with embodiments of the present invention. The identification manager 112 may be implemented as a resistor/capacitor timing circuit (RC) that creates a delayed initial power up indication, controlling the tri-state buffer 114. The tri-state buffer 114 provides isolation from operational function and initial positional identification function, and may be implemented as a field effect transistor (FET). The identification manager 112 may be implemented by hardware, software, firmware, or combinations thereof. For example, the identification manager 112 may be one or more processors and memory. FIG. 2 illustrates a flowchart of an example method for identifying 1-wire slave devices 106 and 108 shown in FIG. 1 in accordance with embodiments of the present invention. In this example, the method may be implemented by the identification manager 112 and the tri-state buffer 114, although the method may be implemented by any suitable component(s). It is noted that although the examples disclosed herein use 1-wire devices, the examples may alternatively be applied to any other suitable type of electronic device.

Referring to FIG. 2, the method includes setting 200, during a startup state, an input of a 1-wire device to indicate an identity of the 1-wire device. For example, referring to FIG. 1, identification manager 112 may determine that one or both of the 1-wire slave devices 106 and 108 have been connected to the computing system 100. If it is an RC, then you know when power becomes asserted that the slave part is in the initial condition. The startup state may begin when the slave devices 106 and 108 are connected, and subsequently end at the end of a predetermined time period or upon the occurrence of an event, examples of which are provided herein. During the startup state, the identification manager 112 may send an enablement signal to the tri-state buffer 114 and hold the signal. The tri-state buffer 114 may pass a logic low signal to the 1-wire slave device 106 and a logic high signal to the 1-wire slave device 108 while the enablement signal is held. Otherwise, if there is no enablement signal, high impedance is output from the tri-state buffer 114 to the slave devices 106 and 108.

In response to input of the logic low signal and logic high signal to the slave devices 106 and 108, respectively, the slave devices 106 and 108 output their respective GPIO inputs from GPIO 111 as a 1-wire message of the current state of input status via GPIO 111 when queried from the 1-wire master 104. The difference in signal status can be used to distinguish the slave devices 106 and 108 from one another. The inputs of GPIO 111 can be used to indicate identities of the slave devices 106 and 108. These inputs of GPIO 111 can be held while the enablement signal is held by the identification manager 112, during the startup state.

In embodiments of the present invention for defining or determining a startup state for the 1-wire devices, a timer may store a time period during which the startup state is defined, and may indicate when the time period is complete. Referring to FIG. 1 for example, the identification manager 112 may determine when the 1-wire slave devices 106 and 108 are connected to the system 100, i.e., the beginning of the startup state. In response to determining that 1-wire slave devices 106 and 108 have been connected to the system, the identification manager 112 may initiate a timer 116 for indicating an end of the startup state. The timer 116 may start and subsequently indicate the end of a predefined time period, i.e., the end of the startup state. Thus, in an example, the timer 116 may be initiated when the slave devices 106 and 108 are connected to the system 100 and subsequently indicate when the predefined time period has ended or when the startup state is complete.

In other embodiments of the present invention for defining or determining a startup state for the 1-wire devices, the startup state may begin when 1-wire devices are connected to the system. For example, the startup state may begin when 1-wire slave devices 106 and 108 are connected to the system 100. The identification manager 112 may detect that the slave devices 106 and 108 are connected to the system 100. This can be done by polling the 1-wire bus for any new slave devices that appear on the bus thus triggering the need to identify the system again. The polling mechanism may be suitably implemented as will be understood by those of skill in the art. The identification manager 112 may detect an event that requires one or both of the slave devices 106 and 108 to enter an operational state. In an example, the requirement may be a requirement of the computing system 100 for a function provided by one or both of the slave devices 106 and 108. Upon expiration of timer, the system can enter the operational state. The startup state may end in response to detection of the event.

The method of FIG. 2 includes receiving 202, at a computing system, the indication of the identity of the 1-wire device. For example, the 1-wire master device 104 may receive signals/messages from the 1-wire slave devices 106 and 108 that indicate their identities. In an example, the identity information may be receiving at any suitable input/output (I/O) interface of the computing system 100. The outputs may be received during the startup state. By receiving identity information for the devices 106 and 108, the computing system 100 may use the identity information to distinguish the two devices 106 and 108, which may be devices of the same type that are used for different functions. For example, the 1-wire device 106 may be used for a presence function, and the 1-wire device 108 may be a light emitting diode (LED). The computing system 100 and/or master device 104 may then be aware of which device to use for implementing the different functions. For example, the computing system 100 the identity information may be used for positionally-identifying the devices 106 and 108 within the computing system. Based upon the system design the master 1-wire device 104 has a predetermined knowledge that the received positionally-identifying data and it's respective function/location.

The method of FIG. 2 includes determining 204 an event for changing from the startup state to an operational state. As described in one of the aforementioned examples, the change from startup state to operational state may be effected by the identification manager 112 when the timer 116 indicates the end of the predefined time period set for the startup state. In another example described herein above, the change from startup state to operational state may be effected by the identification manager 112 when a function of one or both of the slave devices 106 and 108 is required.

The method of FIG. 2 includes distinguishing 206, at the computing system, between the 1-wire device and another 1-wire device based on the indicated identity. As described herein, the identity information provided during the startup state may be used by the computing system 100 and/or master device 104 for distinguishing between the devices 106 and 108. The identity information may be implemented as one device that provides a single input of logic high as designed for providing the LED drive explained above and the slave device with the logic low as the presence detect function as explained above. During the operational state, outputs of the devices 106 and 108 may be enabled to implement operational functions of their respective devices.

The method of FIG. 2 includes changing 208 from the startup state to an operational state in response to determining the event. During the operational state, the slave devices 106 and 108 may provide their respective functions and operations to the computing system 100.

In accordance with embodiments, the identification manager 112 and tri-state buffer 114 may disable inputs of the slave devices 106 and 108 from indicating their respective identities. The inputs may be disabled in response to changing from the startup state to the operational state. For example, the identification manager 112 may turn off the enablement signal applied to the tri-state buffer 114. In response, the tri-state buffer 114 outputs high impedance to the devices 106 and 108 such that their respective input signals do not contain the identification information.

Figure 3:
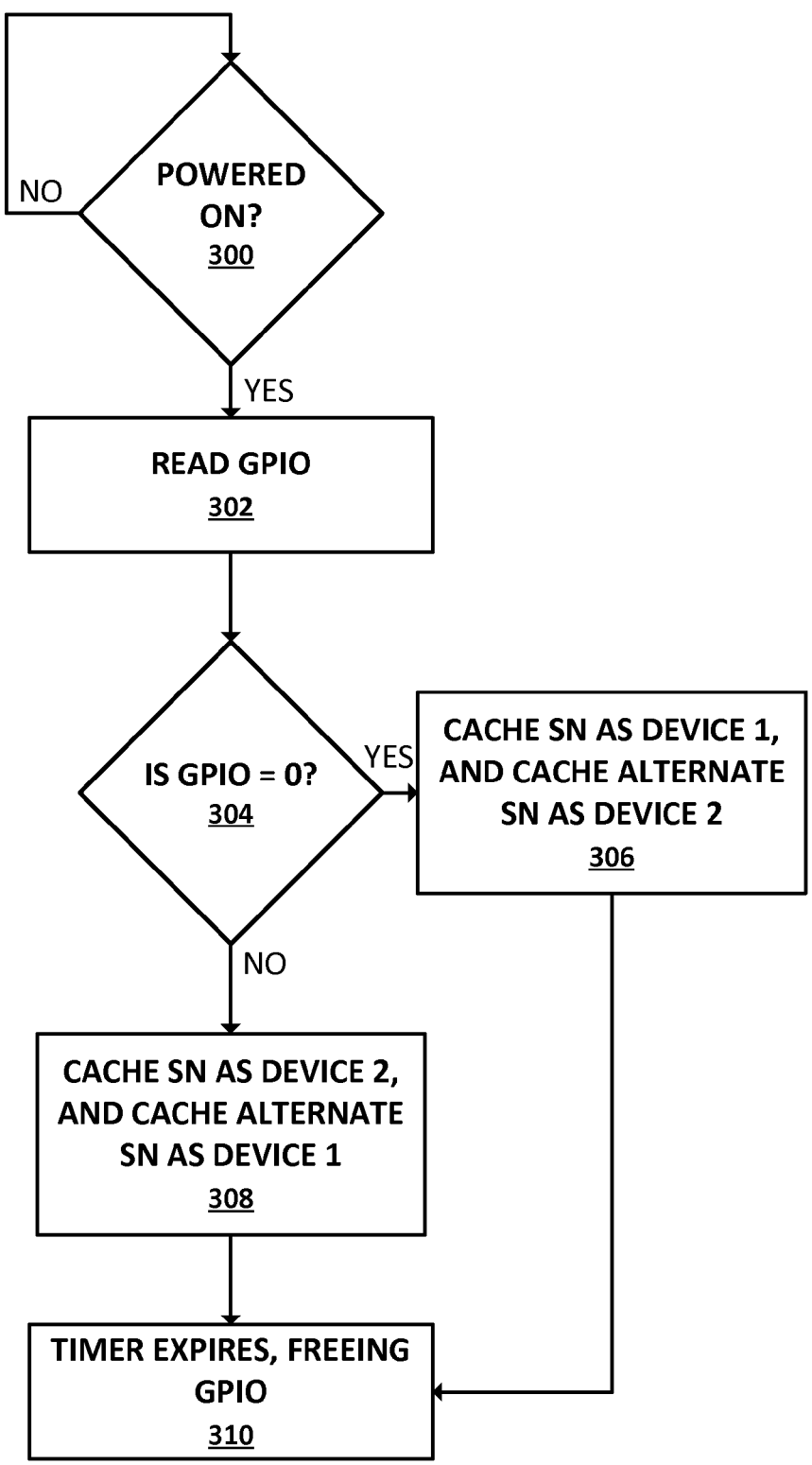
FIG. 3 is a flowchart of an example method for identifying a 1-wire device in accordance with embodiments of the present invention.

FIG. 3 illustrates a flowchart of an example method for identifying a 1-wire device in accordance with embodiments of the present invention. In this example, the method may be implemented by an identification manager, such as the identification manager 112 shown in FIG. 1, and any other suitable components, such as the tri-state buffer 114 shown in FIG. 1, although the method may be implemented by any suitable component(s). It is noted that although the examples disclosed herein use 1-wire devices, the examples may alternatively be applied to any other suitable type of electronic device.

The method of FIG. 3 includes determining 300 whether a 1-wire device is powered on. For example, a computing system or identification manager may determine whether a 1-wire device in a 1-wire network is powered on. In response to determining that the 1-wire device is not powered on, the 1-wire device may continue to be monitored to determine whether it is powered on. In response to determining that the 1-wire device is powered on, the method may proceed to read a GPIO of the 1-wire device.

The method FIG. 3 includes reading 302 a GPIO of the 1-wire device. For example, the GPIO may be read during a startup state that occurs after the 1-wire device powers on. The method may include determining 304 whether the output of the GPIO is logic low. In response to determining that the output of the GPIO is logic low, the method includes caching 306 a serial number of the device as device 1, and caching another serial number of another device as device 2. Otherwise, in response to determining that the output of the GPIO is not logic low, the method includes caching 308 a serial number of the device as device 2, and caching another serial number of another device as device 1.

The method of FIG. 3 includes determining 310 that a timer expires to free the GPIO of the device. For example, the timer 116 shown in FIG. 1 may indicate that the time period for the startup state is over such that the GPIO of the devices may be enabled to implement operational functions of the device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at an electronic device comprising a first input and a second input:
   setting, during a startup state, the first input to set a general purpose input/output (GPIO) of a first slave device to control the first slave device to indicate an identity of the first slave device on a 1-wire bus;
   setting, during the startup state, the second input to set a GPIO of a second slave device to control the second slave device to indicate an identity of the second slave device on the 1-wire bus subsequent to the first slave device indicating the identity of the first device on the 1-wire bus;
   determining an event of a computing system that requires a function of one of the first slave device and the second slave device; and
   in response to determining the event, changing from the startup state to an operational state and enabling the first and second slave devices to implement operational functions,
   wherein the first slave device and the second slave device are each connected to the computing system comprising an input/output (I/O) interface, and
   wherein the method further comprises receiving, at the I/O interface of the computing system, the indications of the identities of the first and second slave devices.

2. The method of claim 1, wherein the identity of the first slave device indicates a position of the first slave device within the computing system, and
   wherein the identity of the second slave device indicates a position of the second slave device with the computing system.

3. The method of claim 1, wherein the identities of the first and second slave devices distinguishes the first and second slave devices from each other and other electronic devices within the computing system.

4. The method of claim 1, wherein the first and second slave devices are each a solid-state device (SSD).

5. The method of claim 1, further comprising setting a timer for indicating an end of the startup state, and
   wherein determining the event comprises receiving, from the timer, the indication of the end of the startup state.

6. The method of claim 1, wherein determining the event comprises detecting a requirement for one of the first slave device and the second slave device to enter the operational state.

7. The method of claim 6, wherein the requirement is a requirement for a function of one of the first slave device and the second slave device provided for the computing system.

8. The method of claim 1, further comprising:
   disabling the inputs of the first and second slave devices to indicate the identities in response to changing from the startup state to the operational state; and
   enabling, during the operational state, the inputs of the first and second slave devices to implement operational functions of the electronic device.

9. The method of claim 1, wherein the first slave device is connected to an input/output (I/O) interface of the computing system,
   wherein the I/O interface is connected to an output of the second slave device, and
   wherein the method further comprises, at the computing system, distinguishing between the first and second slave devices based on the indicated identities.

10. The method of claim 9, wherein the first and second slave devices are the same type of slave devices.

11. The method of claim 9, further comprising using, at the computing system, the first and second slave devices for different functions.

12. The method of claim 9, wherein the first and second slave devices are 1-wire devices.

13. The method of claim 9, wherein the first and second slave devices are each connected to different inputs, and
    wherein the method comprises outputting different signals, at the outputs of the first and second slave devices and during respective startup states of the first and second slave devices, based on the connections at the different inputs.

14. The method of claim 1, further comprising:
    detecting connection of one of the first slave device and the second slave device to the computing system; and
    initiating the startup state in response to detecting connection of the one of the first slave device and the second slave device to the computing system.

15. An apparatus comprising:
    a first input;
    a second input; and
    a hardware identification manager configured to:
    set, during a startup state, the first input to set a general purpose input/output (GPIO) of a first slave device to control the first slave device to indicate an identity of the first slave device on a 1-wire bus;
    set, during the startup state, the second input to set a GPIO of a second slave device to control the second slave device indicate an identity of the second slave device on the 1-wire bus subsequent to the first slave device indicating the identity of the first slave device on the 1-wire bus;
    determine an event of a computing system that requires a function of one of the first slave device and the second slave device; and change from the startup state to an operational state and enable the first and second slave devices to implement operational functions in response to determining the event; and wherein the computing system comprises an input/output (I/O) interface connected to the first input and the second input via the 1-wire bus and configured to receive the indications of the identities of the first slave device and the second slave device.

16. The apparatus of claim 15, wherein the computing system is configured to distinguish between the first and second slave devices based on the indicated identities.

17. The apparatus of claim 16, wherein the first and second slave devices are the same type of electronic devices, and wherein the computing system uses the first and second slave devices for different functions.

18. The apparatus of claim 16, wherein the first and second slave devices are solid-state devices (SSDs).

* * * * *